United States Patent
Johnson

(10) Patent No.: US 10,581,479 B2
(45) Date of Patent: Mar. 3, 2020

(54) ELECTRONIC DEVICE CASE

(71) Applicant: Gavin A. Johnson, East Wenatchee, WA (US)

(72) Inventor: Gavin A. Johnson, East Wenatchee, WA (US)

(*) Notice: Subject to any disclaimer, the term of this patent is extended or adjusted under 35 U.S.C. 154(b) by 0 days.

(21) Appl. No.: 16/115,447

(22) Filed: Aug. 28, 2018

(65) Prior Publication Data

US 2019/0068232 A1 Feb. 28, 2019

Related U.S. Application Data

(60) Provisional application No. 62/551,198, filed on Aug. 28, 2017.

(51) Int. Cl.
| | |
|---|---|
| *B08B 1/00* | (2006.01) |
| *H04B 1/3888* | (2015.01) |
| *A47L 25/00* | (2006.01) |
| *A47L 13/16* | (2006.01) |

(52) U.S. Cl.
CPC .......... *H04B 1/3888* (2013.01); *A47L 13/16* (2013.01); *A47L 25/00* (2013.01); *B08B 1/006* (2013.01)

(58) Field of Classification Search
CPC ..... H04B 1/3888; G06F 1/1681; G06F 1/163; B08B 1/006; A47L 13/16; A47L 25/00
See application file for complete search history.

(56) References Cited

U.S. PATENT DOCUMENTS

| | | | |
|---|---|---|---|
| 2011/0298345 A1* | 12/2011 | Shortt | A45C 11/00 312/237 |
| 2013/0058064 A1* | 3/2013 | Tso | H04M 1/0216 361/807 |
| 2014/0137348 A1* | 5/2014 | Lodge | B08B 1/006 15/104.92 |
| 2014/0259491 A1* | 9/2014 | Colangelo | A47L 13/17 15/209.1 |
| 2014/0311928 A1* | 10/2014 | Mayfield | H04M 1/21 206/205 |
| 2016/0277052 A1* | 9/2016 | Sadek | H04B 1/3888 |
| 2017/0253014 A1* | 9/2017 | Kleeman | B32B 37/003 |
| 2017/0297268 A1* | 10/2017 | Witham | G06F 1/1626 |

* cited by examiner

*Primary Examiner* — Jinhee J Lee
*Assistant Examiner* — Ingrid D Wright
(74) *Attorney, Agent, or Firm* — Krista A. Wittman

(57) ABSTRACT

An electronic device cleaning case and method for construction thereof is provided. A cleaning component includes a backing and a cleaning cloth affixed to a top surface of the backing. A housing is formed as a polygon shape and includes three or more walls, wherein each wall has a semi-cylindrical shape. Four corners are each affixed to two of the walls to form the polygon shape of the housing. The cleaning component is affixed to a bottom surface of the housing and the housing is capable of inversion such that the cleaning component is moved from a bottom of the housing to a top of the housing.

18 Claims, 17 Drawing Sheets

ELECTRONIC DEVICE CASE

CROSS-REFERENCE TO RELATED APPLICATION

This non-provisional patent application claims priority under 35 U.S.C. § 119(e) to U.S. Provisional Patent application, Ser. No. 62/551,198, filed Aug. 28, 2017, the disclosure of which is incorporated by reference.

FIELD

The invention relates in general to mobile device cases and, specifically, to invertible device covers capable of cleaning electronic devices like tablets, smartphones, or smartwatches.

BACKGROUND

The use of mobile electronic computing devices, including smartphones, tablets, laptops, ear buds, and medical devices continues to increase at high levels. In 2017, 77% of adults in the U.S. confirm owning a smartphone. See, http://www.pewresearch.org/fact-tank/2017/06/28/10-facts-about-smartphones/. Further, electronic devices are being utilized into many professional environments. Establishments from restaurants to healthcare facilities are integrating electronic devices into their business practices for convenience and operational efficiency.

In the health care industry, a study by the Manhattan Research/Physician Channel Adoption Study found, in 2012, that 87% of physicians use a smartphone or tablet device in their workplace. See, https://www.ncbi.nlm.nih.gov/pmc/articles/PMC4029126. Meanwhile, healthcare is the fastest-growing sector of the U.S. economy and employees over 18 million employees. See, https://www.cdc.gov/niosh/topics/healthcare/default.html. Accordingly, the use of electronic computing devices is prevalent.

The trend of using mobile computing devices electronics, both personally and in professional environments is concerning because of the high amounts of microorganisms, such as bacteria, that are collected and transferred by the devices. For instance, most electronic devices have a touch screen that is prone to collecting and transferring bacteria. Combining constant handling of handheld electronic devices and heat generated by those devices creates an optimal breeding ground for many microorganisms, such *Staphylococcus aureus, Staphylococcus epidermidis, Pseudomonas aeruginosa, Neisseria sicca*. One study performed found that 82% of smartphones showed some type of bacterial contamination, including *Escherichia coli (E. coli)* and *Staphylococcus aureus*. See, http://healthland.time.com/2011/10/17/study-1-in-6-cell-phones-contaminated-with-fecal-matter. Most touch screens of the handheld devices are made of glass, which has an extremely high transfer rate of 78.6% for *E. coli*, which correlates with an increase rate of contamination by *E. coli*. See, https://aem.asm.org/content/79/18/5728. Unfortunately, people of all ages, including children and those with compromised immune systems, have more access to hand held electronics than ever before and are vulnerable to the contagious microorganisms often found on these devices.

Currently, device users often utilize their shirts, a towel, or other convenient item to wipe the device screen. However, merely wiping the screen, such as to remove smudges, fails to reduce or eliminate any bacteria present on the screen. The users can also utilize a specialized wiping cloth, such as microfiber; however, the cloth may be contaminated based on where the cloth is stored, may not be available, or further bacteria can be transferred from the user's hands when utilizing the microfiber cloth. Further, different disinfectant chemicals may harm the glass screen of handheld devices and may void the warranty of the devices.

Accordingly, there is a need for a cleaning case capable that effectively and conveniently cleans an electronic device without adding additional opportunities for transferring bacteria. Preferably, the cleaning case will be stored with the handheld electronic device.

SUMMARY

An electronic device cleaning case and method for construction thereof is provided. A cleaning component includes a backing and a cleaning cloth affixed to a top surface of the backing. A housing is formed as a polygon shape and includes three or more walls, wherein each wall has a semi-cylindrical shape. Four corners are each affixed to two of the walls to form the polygon shape of the housing. The cleaning component is affixed to a bottom surface of the housing and the housing is capable of inversion such that the cleaning component is moved from a bottom of the housing to a top of the housing.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
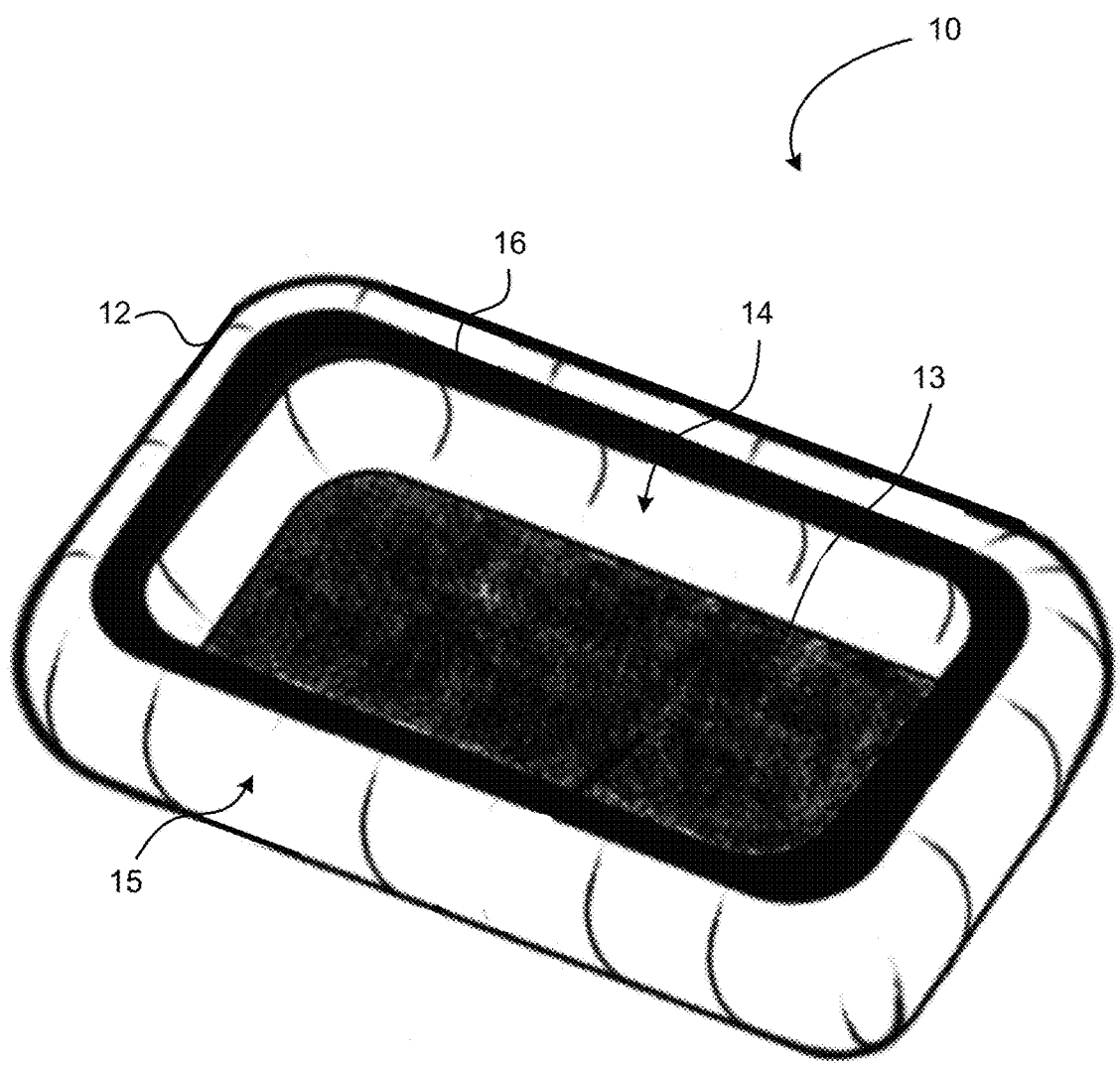
FIG. 1 is a perspective view of a cleaning case for a handheld electronic device, in accordance with one embodiment.

A cleaning case for handheld devices can include a cleaning cloth on an inner surface for protective storing and that is extended outward when utilized for cleaning. FIG. 1 is a perspective view of a cleaning case for a handheld electronic device, in accordance with one embodiment. The cleaning case 10 can include a housing 12, a cleaning component 13, and an overhang 16. A handheld electronic device (not shown) can be placed in the cleaning case with a back of the apparatus resting against the cleaning component, while the overhang surrounds a portion of the screen to keep the device from falling out of the apparatus.

The housing 12 can extend around the cleaning component 13 on one side and the overhang 16 can be affixed to a perimeter of the housing, opposite the cleaning component 13. The housing 12 includes four walls formed as a rectangle, square, or other shape, such as a circle or triangle. When the housing includes three walls and four corners, leaving an opening on one end of the housing, at least one of the corners nearest the opening can be at least partially inverted to remove the handheld device through the opening.

The walls can be made from silicone, plastic, such polypropylene or polyurethane, as well as from a textile material, including a natural fiber, like cotton, wool, silk, or linen; or a synthetic fiber, like acetate, acrylic, nylon, olefin, polyester, or rayon. For example, the housing can be made from faux leather or leather material. Alternatively, the textile walls can be a blend of natural and/or synthetic fibers. Corners of the housing can be straight or curved. The housing can optionally include a back surface, formed on a bottom surface of the walls, which can be made from the same or different material than the walls. A size of the housing can be dependent based on a type of handheld electronic device to be housed in the cleaning case.

In a further embodiment, the walls can be connected via corner pieces. Specially, each of four corners connects two of the walls to form a square or rectangle housing 12. The corner pieces can be made from the same or different material than the wall. However, at a minimum, the corners should be stronger, less flexible, or harder than the material of the walls. If the material is the same, the material of the corners can be thicker or harder so that the corners are less flexible than the walls. If the material is different, the material of the corners can be constructed from a harder or stronger or less flexible material. The stronger or less flexible corners allows a user to push outward on a corner, away from a handheld device placed in the housing to allow the housing to flip inside out to allow a user to remove the handheld device and utilize the cleaning component, which resides on an inside of the housing. Alternatively, the handheld device can be removed by pushing one of the corners inward toward the handheld device, while pulling outward on one or more walls of the housing to flip the housing inside out.

The cleaning component 13 can be affixed to a bottom perimeter of the housing 12 or alternatively, when the walls are curved, the cleaning component 13 can sit on edges 22 extending from the round end of the curved wall, in an interior of the housing. In a further embodiment, the cleaning component can be placed on a top surface of the housing's back surface in the interior of the housing. The cleaning component can be affixed to the walls of the housing 12 via thread, glue, or other adhesive. An inner surface 14 of the housing 12 faces the cleaning component 13, while an outer surface 15 faces away from the cleaning component 13. The cleaning component 13 can include a cleaning cloth and a backing, such as made from plastic, rubber, fabric, such as cotton, nylon, or rayon, or inorganic polymers, such as polysiloxane or polyphosphazene, and organic polymers, such as low-density polyethylene, high-density polyethylene, polypropylene, polyvinyl chloride, polystyrene, teflon, or thermoplastic polyurethanes. Other types of material for the backing are possible, such as an adhesive layer, including tape or velcro.

In one embodiment, the backing of the cleaning component can be formed as a backside of the housing from one or more pieces of material. The cleaning cloth can include fabric, such as a dual-layer microfiber cloth with 80% polyester to 20% nylon, 310 grams per square meter (GSM) and 120 denier threads, as well as natural fibers, including cotton, wool, or silk, and synthetic fibers, including acetate, acrylic, nylon, polyester, or rayon. Alternatively, the cleaning cloth can also include a blend of natural and synthetic fibers. The cleaning cloth can cover a top surface of the entire backing or only a portion of the backing's top surface and can be affixed via glue or other type of adhesive. In a further embodiment, no backing is necessary, and the cleaning cloth is directly affixed to the housing, such as by staples, stitches, or glue, as well as other types of adhesive.

The overhang 16 is affixed to a perimeter of the housing 12, opposite the cleaning component 13. The overhang 16 can be made from a flexible material with elasticity, including rubber, spandex, vinyl, or nylon, as well as other types of material. The overhang 16 can be made from the same or different material as the housing 12 and cleaning component 13. The elastic material of the overhang 16 should, at a minimum, be able to expand and then shrink back to shape to allow entry of the handheld device in the cleaning case and then secure the device in the apparatus. The overhang 16 can be affixed to the housing 12 via staples, stitches, or glue, as well as other types of adhesive. Iii a further embodiment, the walls of the housing can encompass or overlap the overhang. However, in a further embodiment, the overhang is optional and may not be included in the cleaning case.

Figure 2:
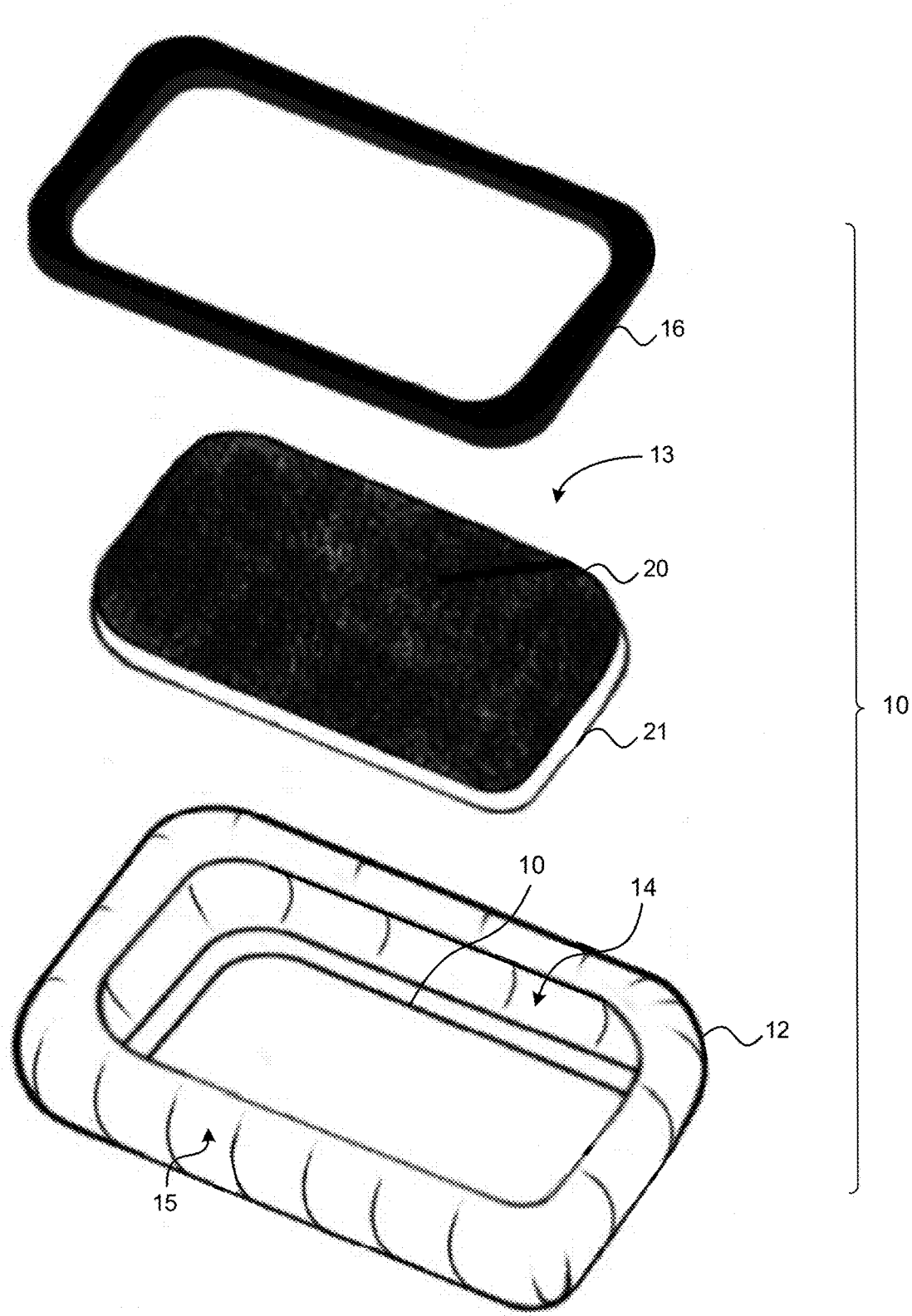
FIG. 2 is a perspective exploded view of the cleaning case of FIG. 1.

FIG. 2 is an exploded view of the cleaning case 10 of FIG. 1. The cleaning case 10 includes a housing 12, a cleaning component 13 with a cleaning cloth 20 and backing 21, and an overhang 16. The housing 12 can include four straight or curved walls formed to fit around sides of a handheld device 30. The cleaning component 13 can be affixed to a bottom perimeter of the housing 12 or alternatively, when the walls are curved, the cleaning component 13 can sit on an interior of the housing, such as on the edges 22 extending from the round end of the curved wall. The overhang 16 is affixed to a perimeter of the housing opposite the cleaning component 13 and can be affixed to an edge of the walls forming the housing. The handheld device 30 can be positioned within the cleaning apparatus such that a back of the device rests upon the cleaning cloth of the cleaning component, while the walls surround the sides of the device and the overhang rests along a perimeter of the device's screen. In one example, the cleaning case fits around the device like a shower cap on a person's head.

Figure 3:
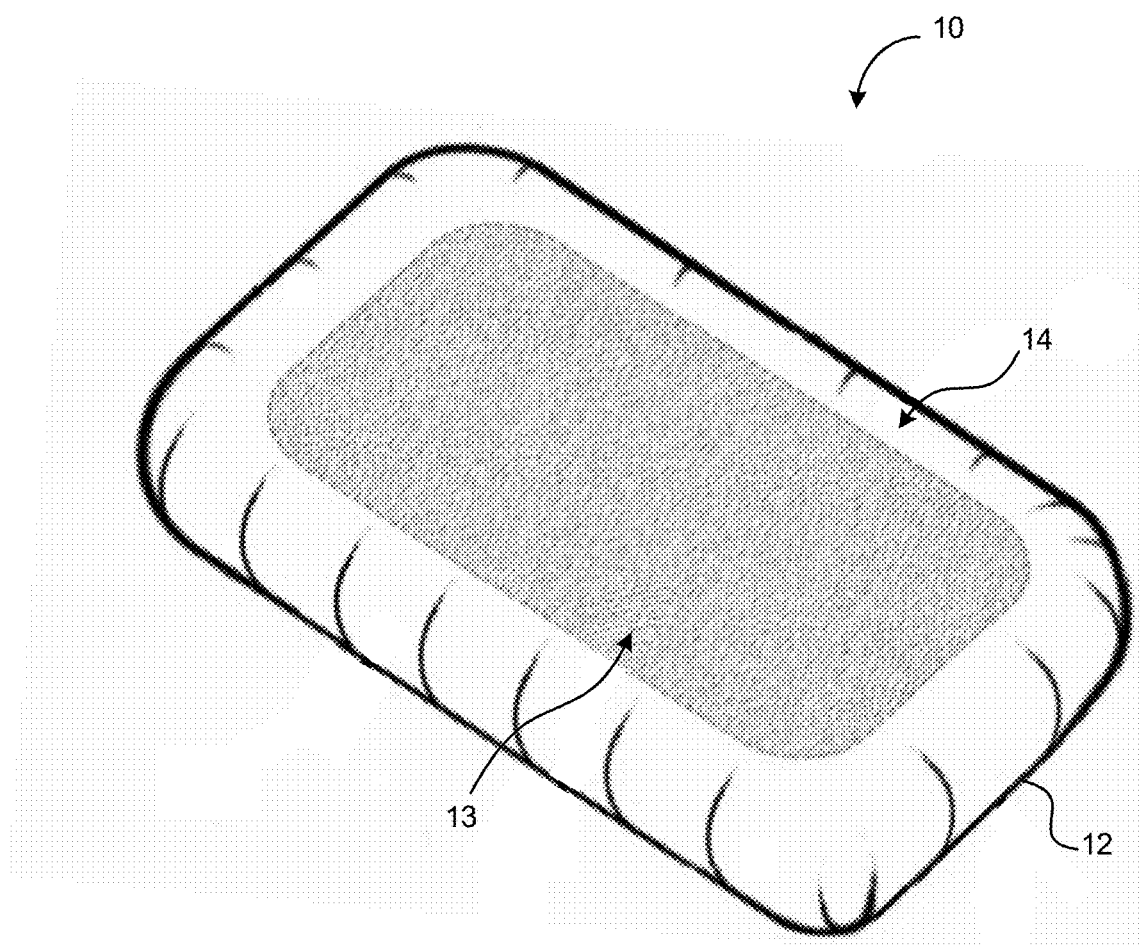
FIG. 3 is a perspective view of the cleaning case of FIG. 1 in an inverted position.

To utilize cleaning features, the cleaning device is inverted to utilize the cleaning component of the case. FIG. 3 is a perspective view of the cleaning case of FIG. 1 in an inverted position. A user of a handheld electronic device which is housed in the cleaning case 10 can remove the device. In a further embodiment, the cleaning case 10 can be inverted while the handheld device is housed in the case to allow easy removal. Once removed, the user can invert the cleaning case by flipping the case inside out so the inner surface 14 of the housing is now facing outwards and the cleaning component 13 is raised above the perimeter of the housing with the overhang (now shown). For use in cleaning the handheld device, the user slides one or two fingers against the outer surface of the housing 12, which are now facing inward under the cleaning component 13. The user can apply pressure to the cleaning component to scrub a surface of the device with the cleaning cloth.

Figure 4:
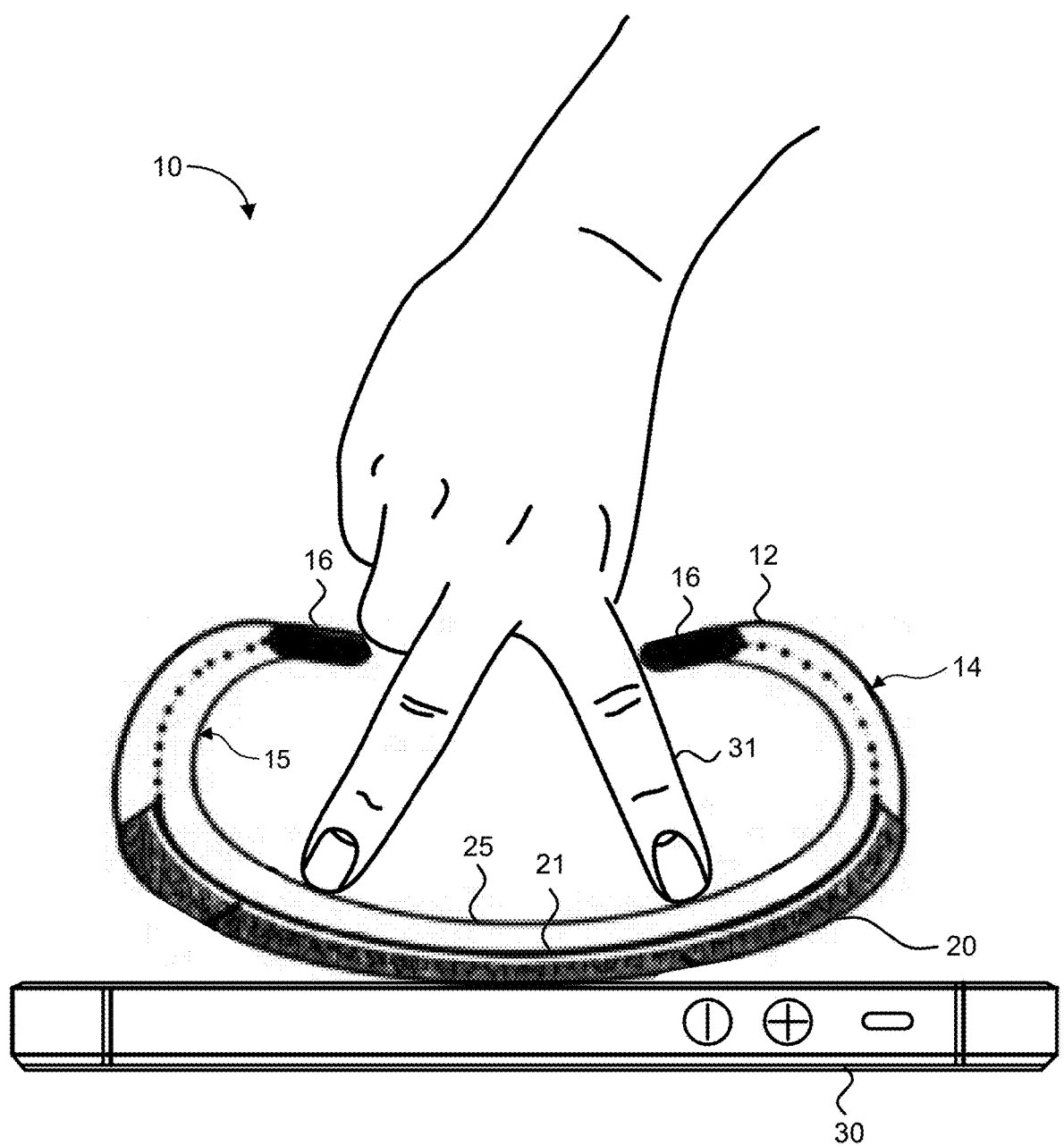
FIG. 4 is a cross section view of the cleaning case of FIG. 1 in an inverted position.

When inserted, the user's fingers can press against the backing of the cleaning component to apply pressure to the cleaning cloth placed against the screen of the handheld device. FIG. 4 is a cross section view of the cleaning case of FIG. 1 in the inverted position shown in FIG. 3. When the cleaning case 10 is inverted, the inner surface 14 of the housing 12 and the cleaning cloth 20 faces outward, while the outer surface 15 of the housing and a back surface 25 of the housing faces inward. The user inserts one or more fingers 31 into an interior of the inverted case 10 and applies pressure to the back surface 25 of the housing 12 or alternatively, the backing of the cleaning component, if no back surface is provided on the housing, to clean a surface of a handheld device 30.

Figure 5:
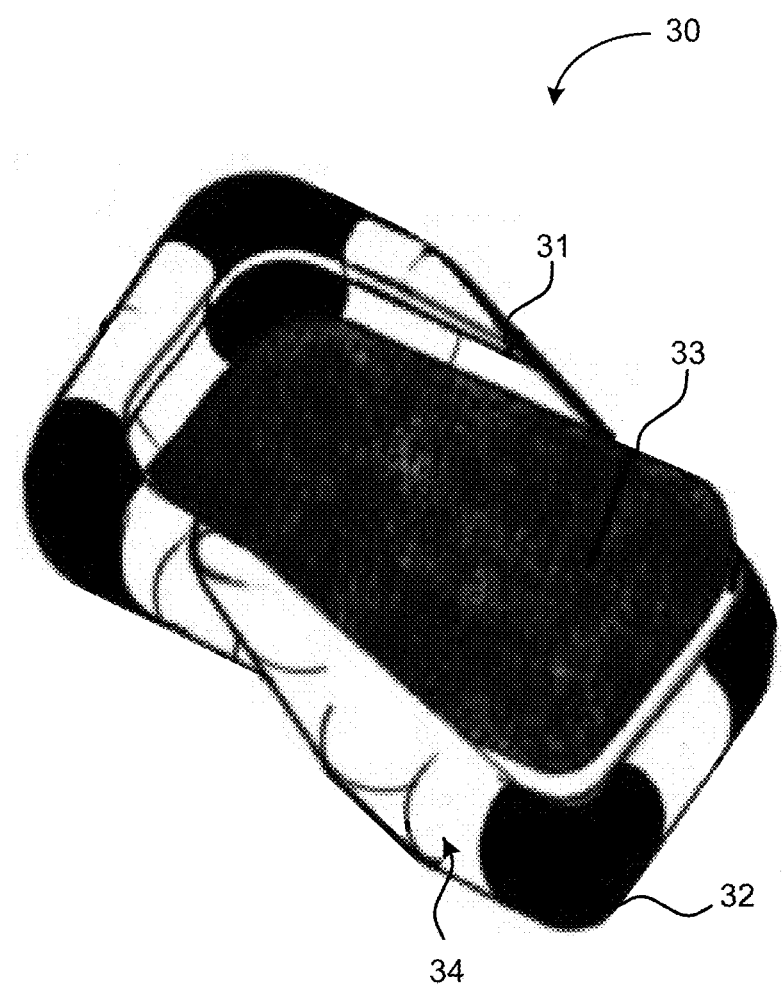
FIG. 5 is a perspective view of a cleaning case with a support frame that is partially inverted.

In a further embodiment, the cleaning case can include a support frame to provide additional support to the electronic device within the case, as well as reduce the amount of pressure needed by a user for cleaning the device. FIG. 5 is a perspective view of a further embodiment of a cleaning case 30 that is partially inverted. The cleaning case 30 includes a housing 31, a support frame 32, and a cleaning component 33. The housing 31 can have a backing (not shown) and four walls 34, which line a perimeter of the backing to create an interior in which a handheld computing device can be housed. In one embodiment, the housing 31 completely covers the support frame 32; however, in a further embodiment, the corners of the walls can be cut out so that each wall is attached to two corner of the support frame 32. When the housing 31 completely covers the support frame, the walls 34 can be made from a single piece of material. Further, an edge can be perpendicularly affixed on a top surface of the walls, opposite the backing to secure the handheld device in the case. However, other angles for the edge extending from a wall are possible.

The housing 31 can be made from a flexible material, such as an inorganic polymer, including polysiloxane or polyphosphazene, or an organic polymer, including low-density polyethylene, high-density polyethylene, polypropylene, polyvinyl chloride, polystyrene, nylon, teflon, or thermoplastic polyurethanes. Synthetic polymers like polychloroprene, known as neoprene, or chloroprene rubber, may also be used. Alternatively, the flexible material may be a blend of polymers capable of repeatedly being folded and inverted. At a minimum, the material should be capable of repeated inversion.

Figure 6:
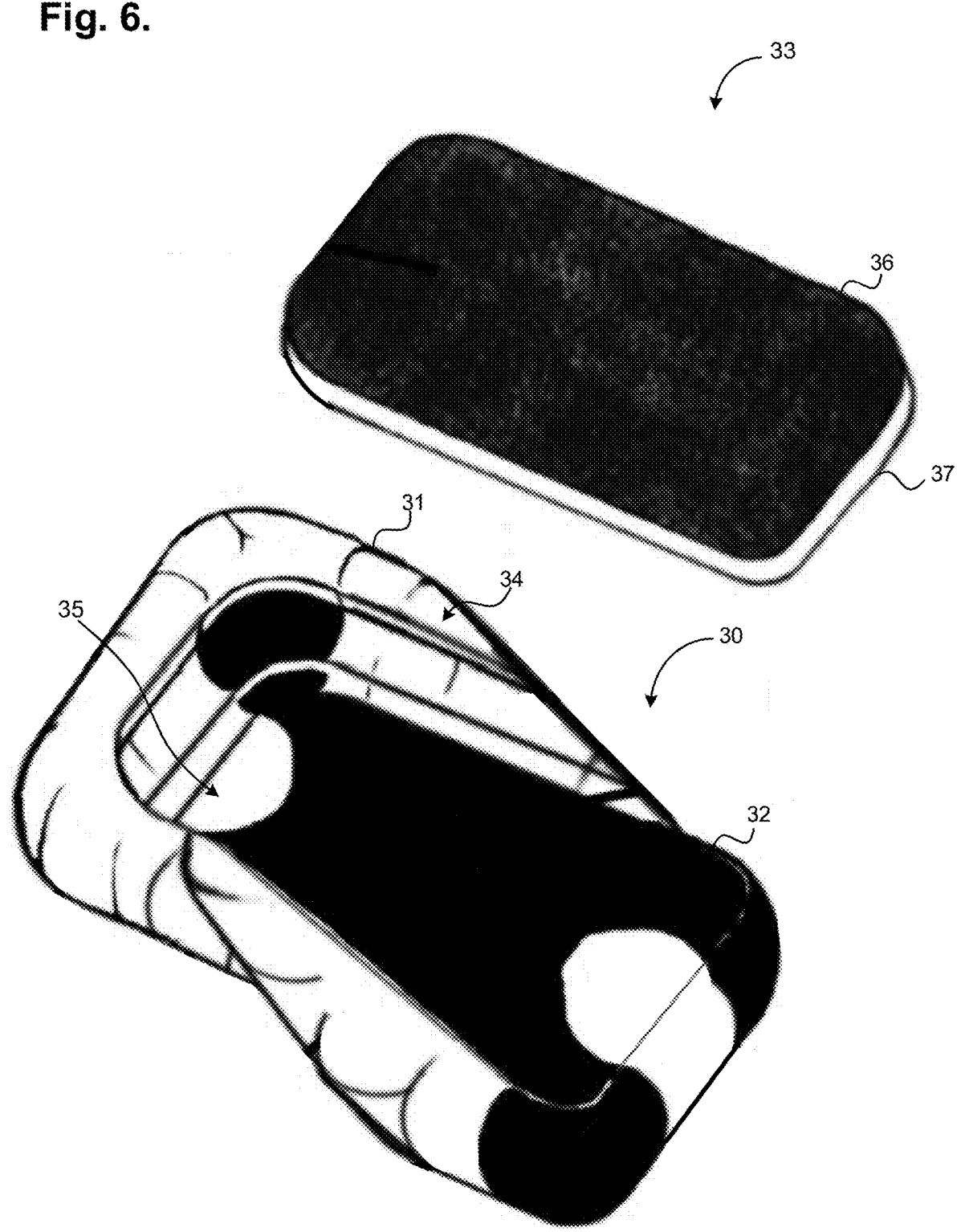
FIG. 6 is a perspective view of the cleaning case of FIG. 5 with the cleaning component removed.

The support frame 32 can be positioned in the interior of the housing 31. FIG. 6 is a perspective view of the cleaning case 30 of FIG. 5 with the cleaning component removed. The support frame 32 can be positioned in the interior of the housing 31 such that the support frame rests upon a top surface of the backing 35 in the interior of the housing 31. A shape of the support frame 32 can resemble an X with ends that shape upward along the walls of the housing 31 to protect the corners of the handheld device when inserted in the case. In one embodiment, the ends of the support frame extend perpendicular to the support frame and along an inner surface of the corners, where two of the walls meet. Alternatively, the extended ends of the support frame are on an outer surface of the case. Specifically, each wall of the housing 31 connects to two extended ends of the support frame, which form the corners of the case 10. The support frame 32 can be made from the same or different material of the housing 31. However, in one embodiment, the material of the support frame 32 can be harder, thicker, or less flexible than the housing 31. The cleaning component 33, including a cleaning cloth 36 and optionally, a backing 37, is positioned on a top surface of the support frame 32.

Figure 7:
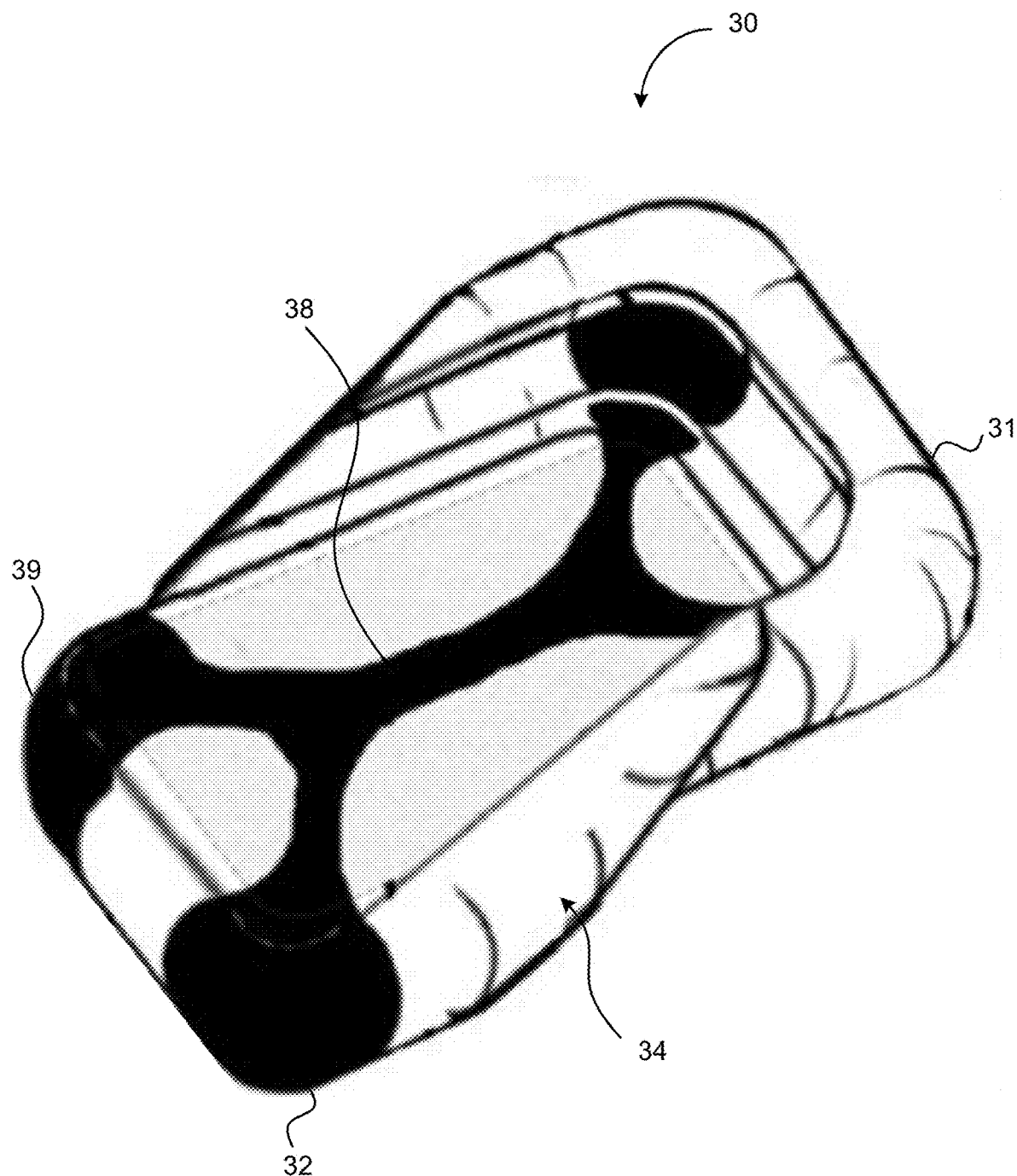
FIG. 7 is a perspective view of the cleaning case of FIG. 6 with a different size support frame.

Different sizes and ratios of the support frame are possible. For example, FIG. 7 is a perspective view of the cleaning case of FIG. 6 with a different size support frame. The support frame 32 is affixed in an interior of the case 30 above a back surface 35 of the housing 31. The support frame 32 can resemble the shape of the letter "X," with ends 39 of the X extending perpendicularly upward to a top surface of the housing opposite the backing 35. Alternatively, the support frame can be shaped as a long stem or body 38, with two lines extending from the stem at different angles, such as to form the letter "V," which extends from the stem Ends 39 extend substantially perpendicular to the support frame to form a support for the corners of the housing. Here, the body of the support frame is narrower than the body of the support frame as discussed above with respect to FIG. 6. Other shapes of the support frame are possible and may include materials protruding through the interior 34 and exterior 35 surfaces of housing 31 for case 30 to become a co-molded piece.

For example, the support frame can include a stem with two ends extending from each end of the stem at different angles, similar to a letter "V." The ends then extend upward at an angle, such as 90 degrees to the corner of the housing. However, other angles are possible.

Returning to the discussion with respect to FIG. 5, the cleaning component 33 is positioned on a top surface of the support frame 32 within the interior of the case 30. As described above with respect to FIG. 1, the cleaning component 33 can include a cleaning cloth and a backing, and can be affixed in the interior of the cleaning case on a top surface of the support frame 32. Alternatively, the cleaning cloth can be directly affixed above the support frame 32 in the interior of the case 30. The cleaning cloth can be a microfiber cloth, as well as another material, such as described above with respect to FIG. 1.

To invert the case 30 to allow for cleaning, at least two corners of the case can be inverted to pull one or more of the walls of the housing downward and below the backing 35. Such movement, allows a user to insert the handheld device and slide the device along the cleaning component 33. Alternatively, the user can turn the remaining two corners down so that all four walls of the housing are now facing downward and positioned below the backing with the cleaning component. If necessary, users can press on a back surface of the housing backing 35 to apply pressure to the cleaning component, which is placed against a screen of the handheld device.

Figure 8:
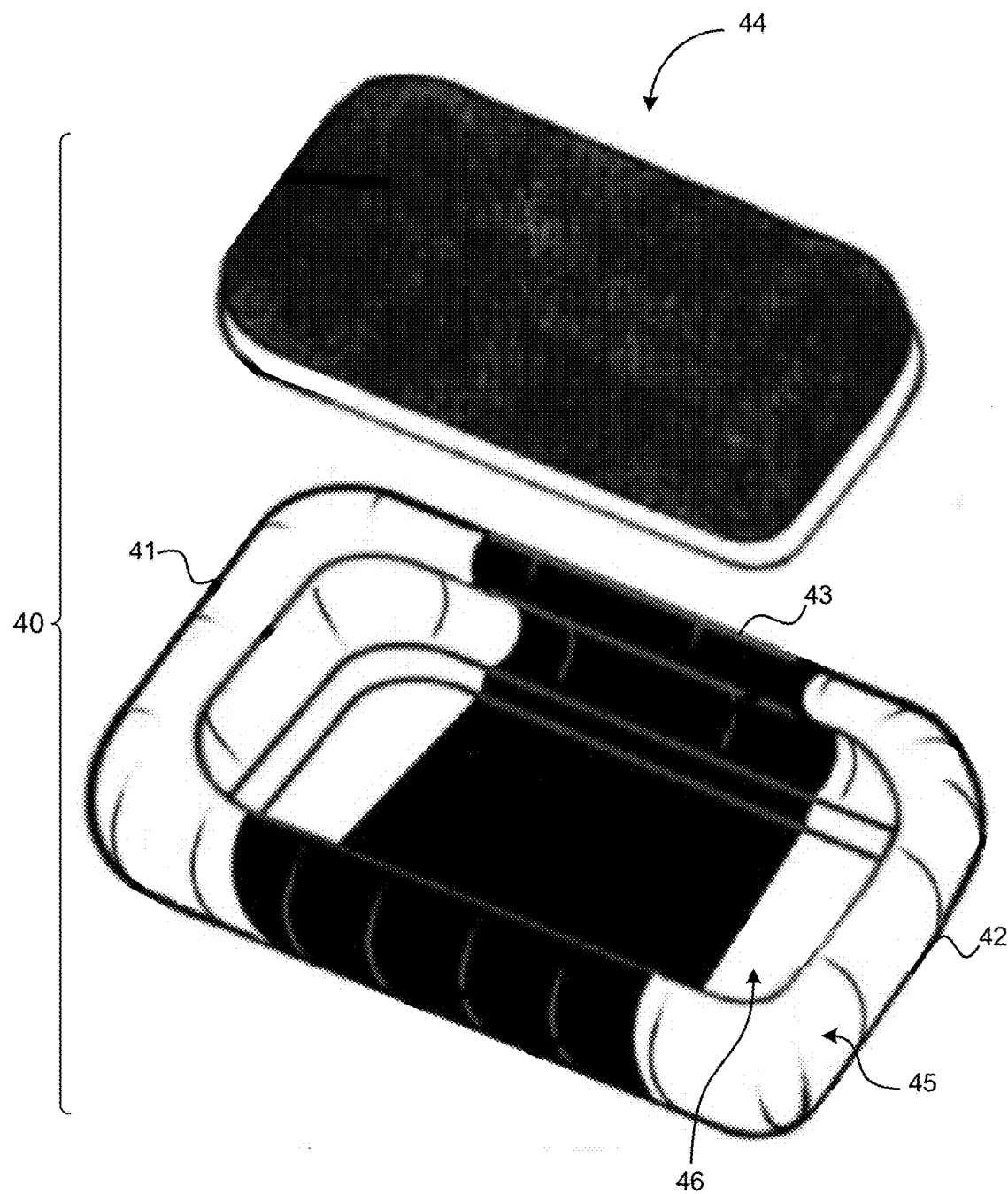
FIG. 8 is a perspective view of a further embodiment of a cleaning case with a different shaped support frame.

Other shapes of the support frame are possible, which can affect how the case is transformed to allow access to the cleaning component. FIG. 8 is a perspective view of a further embodiment of a cleaning case 40 with a different shaped support frame. The cleaning case 40 includes a top housing 41, a bottom housing 43, a frame 43, and a cleaning component 44. The frame 43 can include a backing with two curved sides that form part of the walls of the case. In one embodiment, the curved sides resemble the letter "C," which results in an overhang on a surface opposite the backing. The backing can have a rectangle or square shape.

Each end of the frame 43 can be attached to one of the top housing 41 and bottom housing 42. Each of the top housing 41 and bottom housing 32 can have a rectangular or square backing 46 with three sides of the backing affixed to walls 45 that curve upward, away from the backing. The end of each of the top housing and bottom housing without a wall are affixed on opposite ends of the frame and the walls of the top and bottom housings alight with the walls of the frame. The backings of the top housing, bottom housing, and frame form a back surface of the case, while the walls of the top housing, bottom housing, and frame form sides of the case to hold the handheld device.

Figure 9:
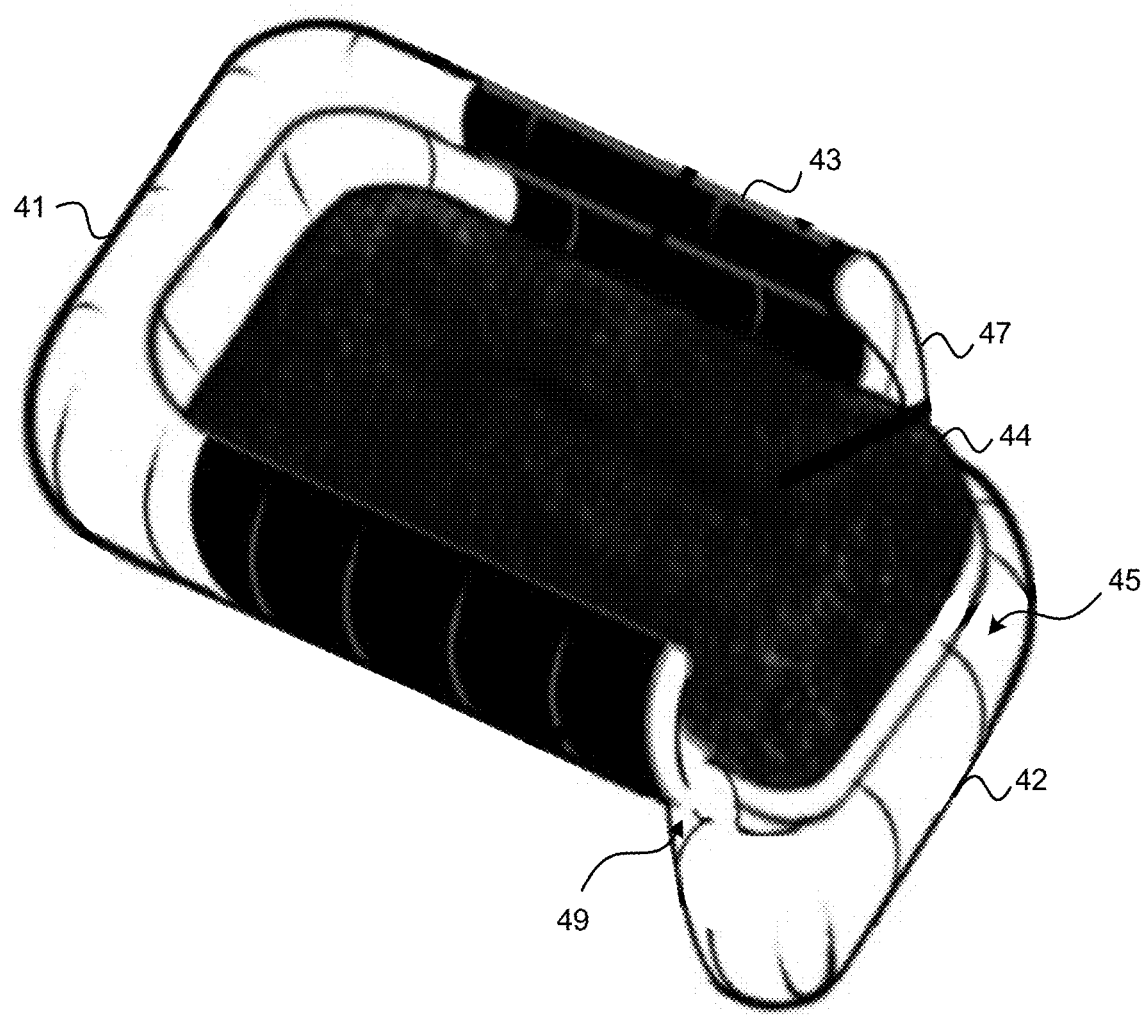
FIG. 9 is a perspective view of the cleaning case of FIG. 8 in an open position.

One or both of the top and bottom housings can pivot away from the frame to allow the handheld device housed by the cast 40 to be removed for cleaning. FIG. 9 is a perspective view of the cleaning case of FIG. 8 in an open position. Open edges 47 of the walls on the frame 43 and the bottom housing 42 are aligned when the case is in a closed position to securely house the handheld device. To remove the device for cleaning, the bottom housing is rotated downward away from the frame by pivoting around an axis 49, while still remaining connected by a connecting member (not shown), such as a pivot mount, rotating bar, or other types of connecting members. Further, when the housings are co-molded with the support frame, the walls and corns can fold on themselves when the bottom housing 42 or top housing 41 are flipped inside out. When rotating, the walls of the bottom housing move away from the walls of the frame and flex enough to remove the device.

Once opened, a user can remove the handheld device from the case by sliding the device out of the case through the opening formed by movement of the bottom housing. Subsequently, the user can turn the device over so the screen of the device faces the cleaning component, and slide the device back and forth over the cleaning cloth.

Figure 10:
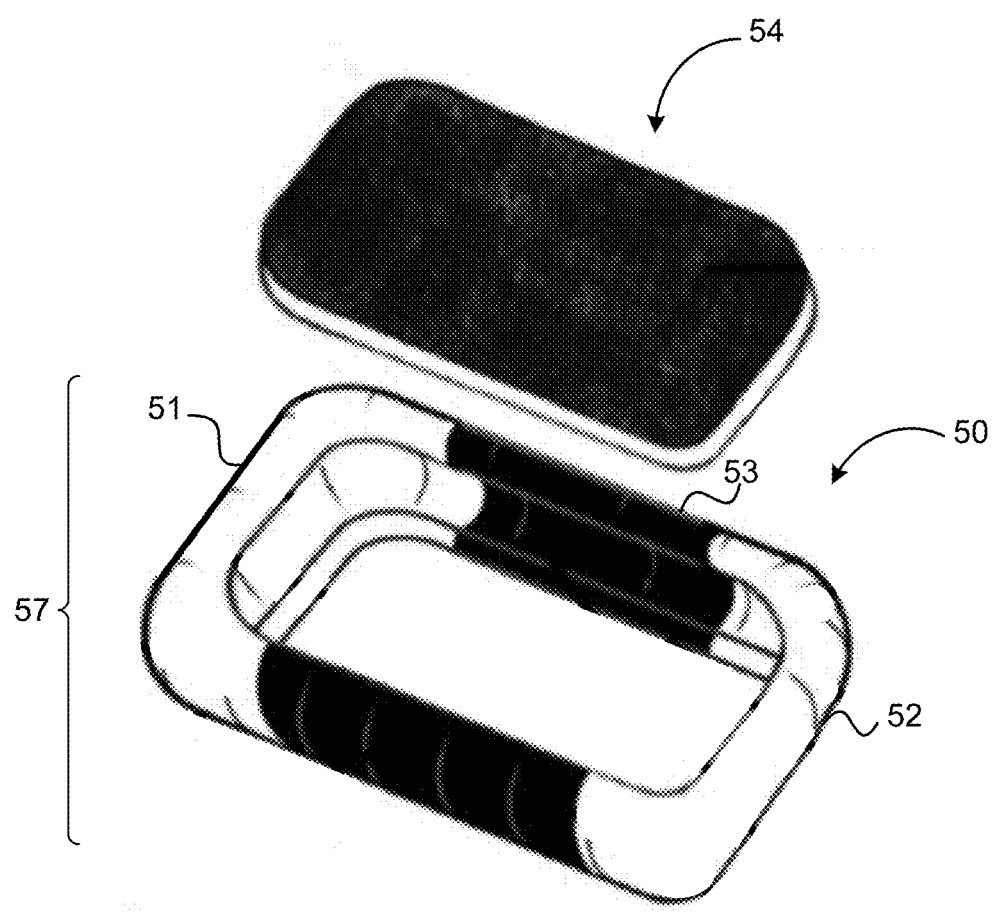
FIG. 10 is a perspective view of a further cleaning case with a different shaped support frame.

In a further embodiment, the support frame can include two walls, which are integrated into the housing. FIG. 10 is a perspective view of a further cleaning case with a different shaped support frame. The cleaning case 50 can include a body 57 and a cleaning component 54 that fits within the body 57. The body 57 includes a top housing 51, a bottom housing 52, and a support frame 53. The top and bottom housings can include curved walls that are each semi-cylindrical shaped, like the letter "U." The curve of the walls also form a shape similar to the letter "U" to provide an edge on a bottom surface to receive the cleaning component 54 and an edge on a top surface to prevent the handheld device from falling out of the case.

The frame 53 includes two straight walls that are curved on one side in a semi-cylindrical shape, such as the shape of a "U." The walls of the frame 53 align with the walls of the top and bottom housings to form the shape of a square, rectangle, or other shape. The cleaning component 54 can include rectangular or square shape, which is dependent on the shape of the body 57. The cleaning component 54 is affixed to the edge on the bottom surface of the body to form a backing of the body. As described above with respect to FIG. 9, one or both of the top and bottom housings 51, 52 can be rotatably affixed to the frame via open edges of the respective walls. For example, the bottom housing can be rotated downward away from the frame 53 by pivoting around an axis (not shown). For example, the bottom housing can be connected to the frame via a flexible adhesive layer that can the cleaning component or a separate flexible layer that is positioned between the back surface of the housing or case and the cleaning component. Alternatively, the bottom housing can be connected to the support frame by a connecting member (not shown), such as a pivot mount, rotating bar, or other types of connecting members. When rotating, the walls of the bottom housing move away from the walls of the frame.

Figure 11:
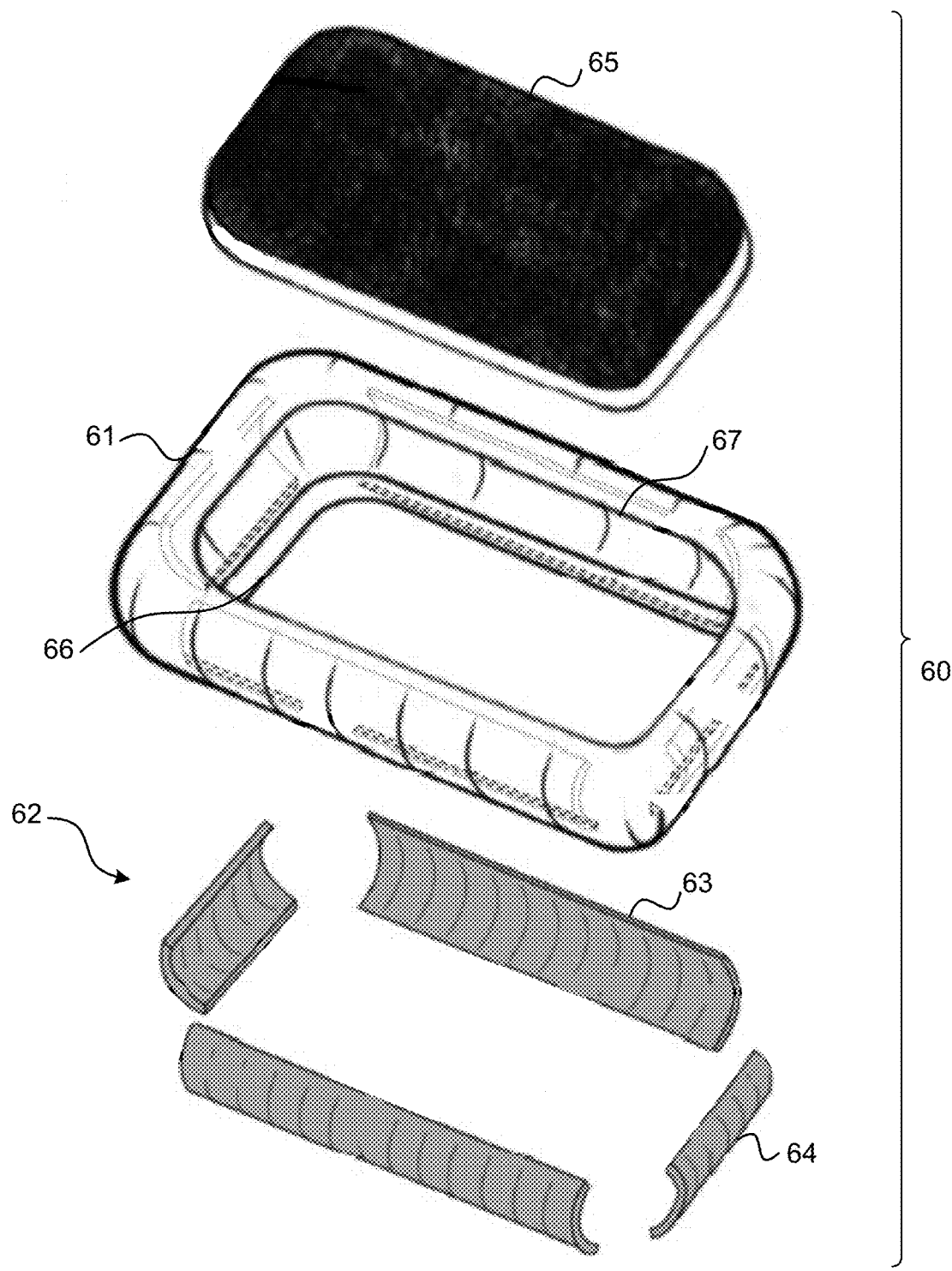
FIG. 11 is exploded view of a still further cleaning case with a different shaped support frame.

In a further embodiment, the support frame can include four separate pieces, FIG. 11 is an exploded view of a still further cleaning case 60 with a different shaped support frame. The cleaning case 60 can include a housing 61, a support frame 62, which includes four separate pieces, and a cleaning component 65. The housing 61 can include curved walls formed in the shape of a square or rectangle. However, other shapes are possible. The curvature of the walls can have a U shape to provide an edge 66 on a bottom surface of the housing 61 to receive the cleaning component 65 and an edge 67 on a top surface to secure the handheld device in the case. In one embodiment, two of the walls 63 are longer than the remaining two walls 64. However, other numbers of walls are possible, including a single wall.

Figure 12:
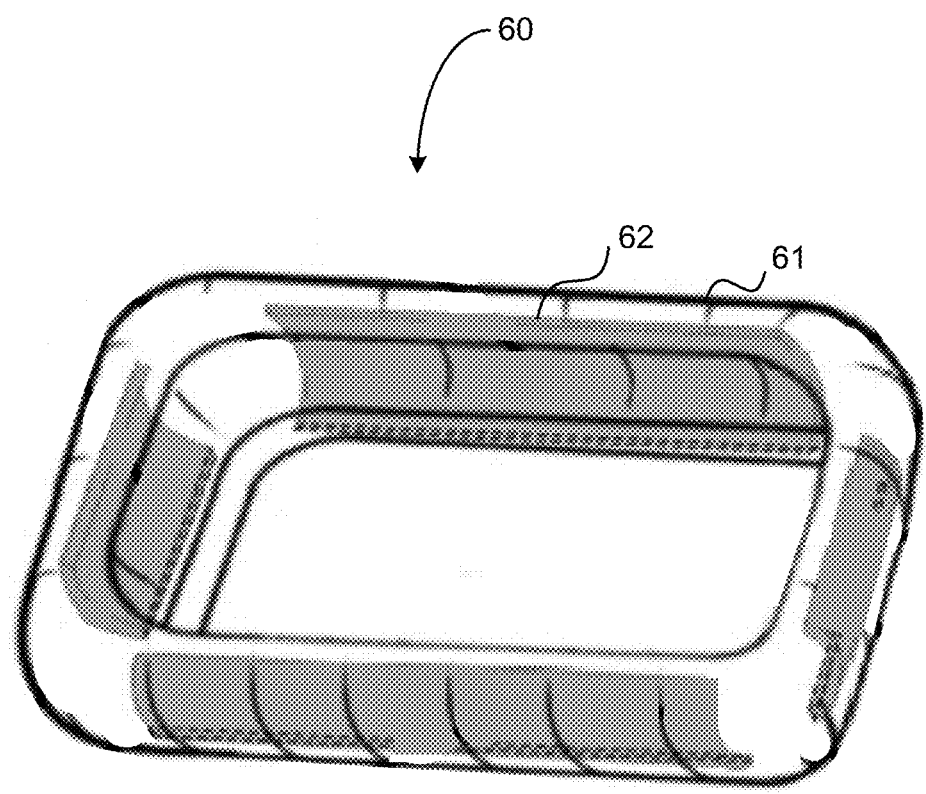
FIG. 12 is a perspective view of the cleaning case of FIG. 11 with the support frame inserted.

The support frame 62 can include multiple separate walls 63, 64 that each fit within one side of the housing. FIG. 12 is a perspective view of the cleaning case 60 of FIG. 11 with the support frame inserted. The support frame 62 includes four walls each inserted within an interior of the U-shaped walls of the housing 61. Each support frame wall has curved walls formed along a straight line and is semi-cylindrical. In one embodiment, two of the support frame walls are longer than the remaining two support frame walls. The longer walls can each be positioned along a side of the housing, while the shorter walls are each placed along a top or bottom end of the housing.

Returning to the discussion with respect to FIG. 11, the cleaning component 65 can include a cleaning cloth and backing, or alternatively, only a cleaning cloth. The cleaning component can be placed in an interior of the housing and affixed to the bottom surface edges 66 to form a back surface of the cleaning case 60. The handheld device can be removed by inverting the walls of the housing and support frame or by creating an axis of rotation between the side walls and the end walls of the support frame.

Figure 13:
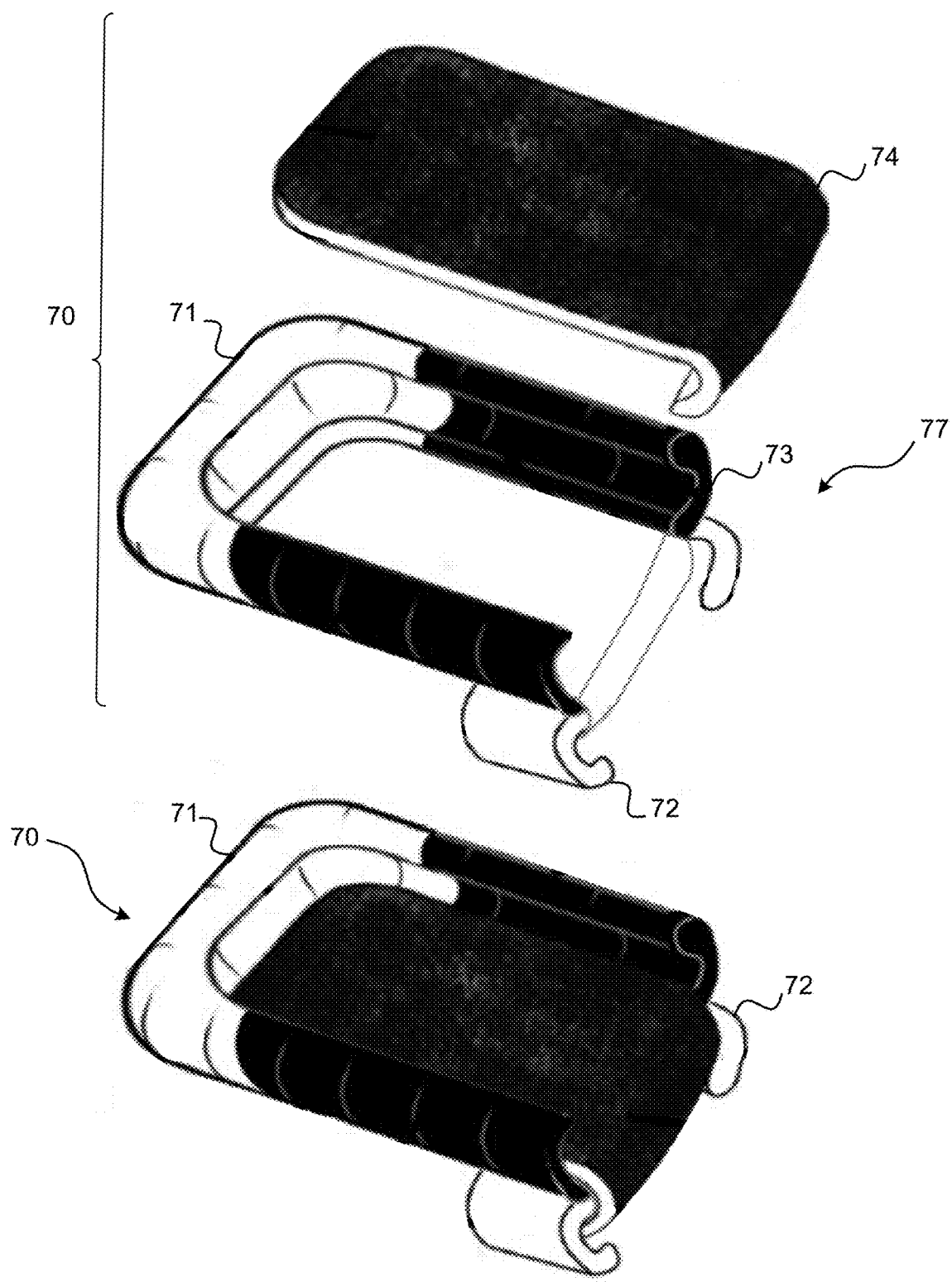
FIG. 13 is a perspective view of a cleaning case with a different shaped cleaning component.

A shape of the cleaning component can be dependent on a type or shape of the support frame. FIG. 13 is a perspective view of a cleaning case 70 with a different shaped cleaning component. The cleaning case 70 can include a body 77 and a cleaning component 74 that fits within the body 77. The body 77 includes a top housing 71, a bottom housing 72, and a support frame 73. The top and bottom housings can include curved walls that are each semi-cylindrical shaped, like the letter "U." The curve of the walls also form a shape similar to the letter "U" to provide an edge on a bottom surface to receive the cleaning component 74 and an edge on a top surface to prevent the handheld device from falling out of the case.

The frame 73 includes two straight walls that are curved on one side in a semi-cylindrical shape, such as the shape of a "U." The walls of the frame 73 align with the walls of the top and bottom housings to form the shape of a square, rectangle, or other shape. The cleaning component 74 can include rectangular or square shape with one end that curves downward and away from the cleaning cloth. In a further embodiment, the cleaning component 74 includes a rectangular or square shape than bends downwards only when either the bottom or top housings open away from the handheld device. The curved portion of the cleaning component can then be used to wipe a screen of the handheld device similar to a squeegee.

The case 70 opens to allow removal or placement of the handheld device in the case by rotating the bottom housing 72 around the curved end of the support frame 73, which serves as the axis of rotation, to move downwards away from a top surface of the frame's backing. In a further embodiment, the bottom housing and the frame are rotatably connected via a ball and joint, fulcrum, or other pivot points or bolts. In a further embodiment, a flexible material can cover a portion of or the entire surface of the backings of the top and bottom housings and the support frame to allow rotation of the bottom housing and to secure the bottom housing to the support frame. Once the case 70 is open, a user can remove the handheld device, flip the device so the screen faces the cleaning cloth of the cleaning component, and move the handheld device back and forth over the cleaning cloth.

Figure 14:
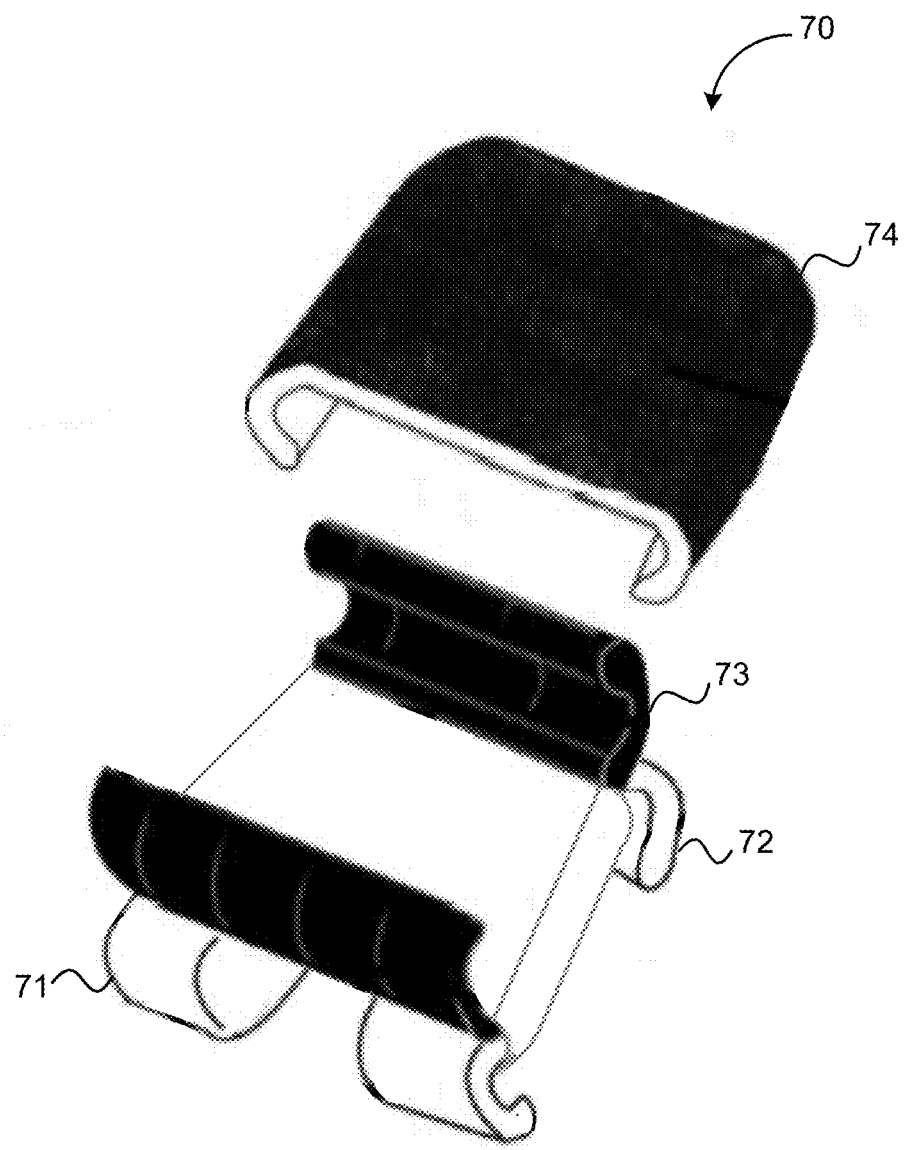
FIG. 14 is a perspective view of a cleaning case with a different embodiment of the different shaped cleaning component.

In a further embodiment, both ends of the cleaning component 74 can be curved to allow rotation of both the top and bottom housings. FIG. 14 is a perspective view of a cleaning case 70 with a different embodiment of the different shaped cleaning component. The cleaning component 74 can have a rectangular or square shape with two ends, opposite one another, than curve downwards, such as in a semi-cylindrical shape. Alternatively, the cleaning component 74 can be shaped as a rectangle, square or other shape and the ends may only move downward away from the handheld device when the bottom or top housings open and rotate away from the handheld device. Each of the top and bottom housings 71, 72 can be affixed to the frame via a flexible layer that allows rotations of both the housings and is placed above a back surface of the housing and below the cleaning component. Alternatively, the top and bottom housings and the frame are rotatably connected via a ball and joint, fulcrum, or other pivot points or bolts. Further, the cleaning component can fit over the bottoms of the housings and the frame to provide further support for the housing rotation.

Figure 15:
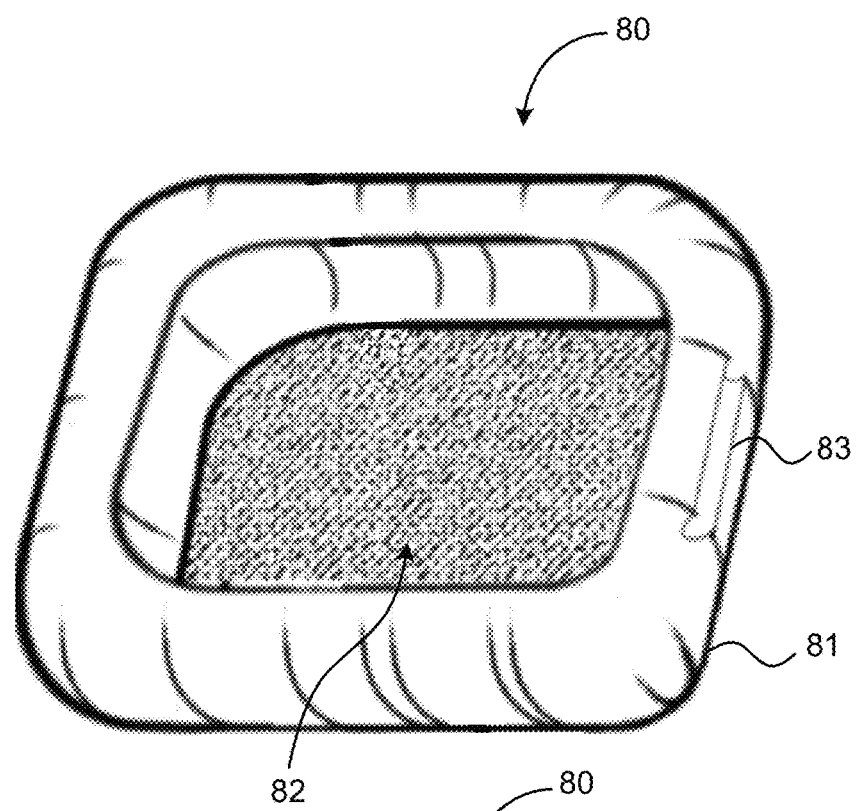
FIG. 15 is a cleaning case for a watch face on a watchband.

The cleaning case can also be embodiment on a watch. FIG. 15 is a cleaning case 80 for a watch face on a watch band. The case includes a housing 81 that is formed in the shape of a polygon, such as a square or rectangle, and a cleaning component 82 that is positioned in an interior of the housing 81. The housing 81 can be made from silicone, plastic, such polypropylene or polyurethane, a textile material, including a natural fiber, like cotton, wool, silk, or linen; or a synthetic fiber, like acetate, acrylic, nylon, olefin, polyester, or rayon, as well as faux leather or leather material. Alternatively, the textile walls can be a blend of natural and/or synthetic fibers. The housing can be made from a single piece of material or different pieces. In one embodiment, corners of the housing are less flexible than walls of the housing and can be made from the same or different materials. If made from the same material, the material for the corner is harder or thicker than the walls to ensure that the corners are less flexible. The walls and the corners all have a semi-cylindrical shape or U-shape with the rounded part on an outside surface and an empty concave interior shaped to house the watch face. Meanwhile, the cleaning component 82 can include a cleaning cloth and optionally, a backing on which the cleaning cloth is affixed.

One or more notches 83 can be formed in an outer surface of the housing 81. In one embodiment, a notch 83 is formed within the housing on opposite sides to accept ends of a watch band for placement on a user's wrist.

Figure 16:
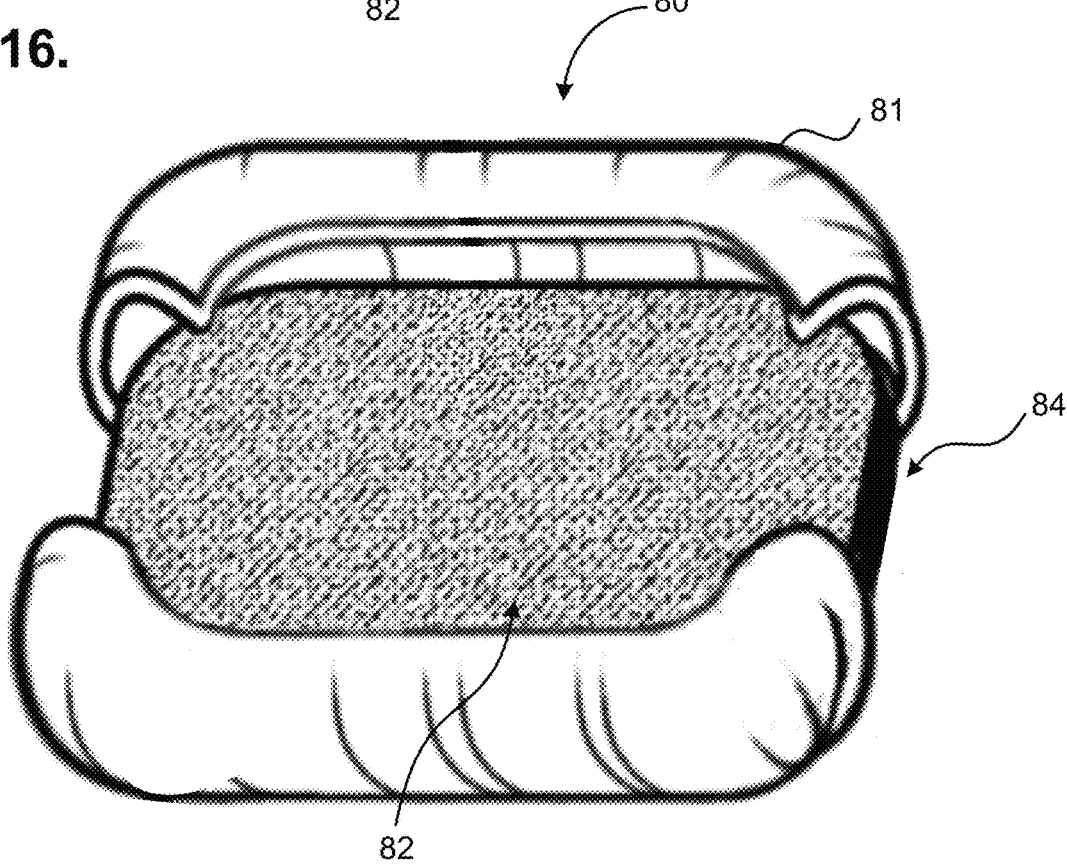
FIG. 16 is a perspective view of the cleaning case of FIG. 15 with cutouts.

In a further embodiment, the housing can have one or more cutouts to accommodate dials and other switches on side surfaces of the watch face. FIG. 16 is a perspective view of the cleaning case of FIG. 15 with cutouts. One or more cutouts 84 can be made in the housing 81 of the cleaning case 80. The cutouts allow the housing to fit securely around a perimeter of a watch face and allow dials or any other pieces extending from the perimeter of the watch face to stick out via the cutouts 84. A watchband can be affixed to two opposite sides without the cutouts. Alternatively, the watchband can be affixed to the two sides with the cutouts, when the cutouts act as a notch for adhering the watchband or use a single cutout for a monocle-type watch-chain.

A cleaning component 82 can be affixed to the housing, such as on a bottom surface of the housing to act as a back surface for supporting the watch face. In one embodiment, the cleaning component is affixed to an interior of the bottom surface of the housing, such as provided by one end of the semi-cylindrical shape or the end of the stem of the U-shape. In a further embodiment, the cleaning component 82 is affixed to an exterior surface of the housing's bottom surface via glue, staples, thread, or other adhesive. In an alternate embodiment the cleaning component 82 is the case back surface held together by glue(s), stitching(s), or other form of adhesion(s) along the bottom back perimeter.

Figure 17:
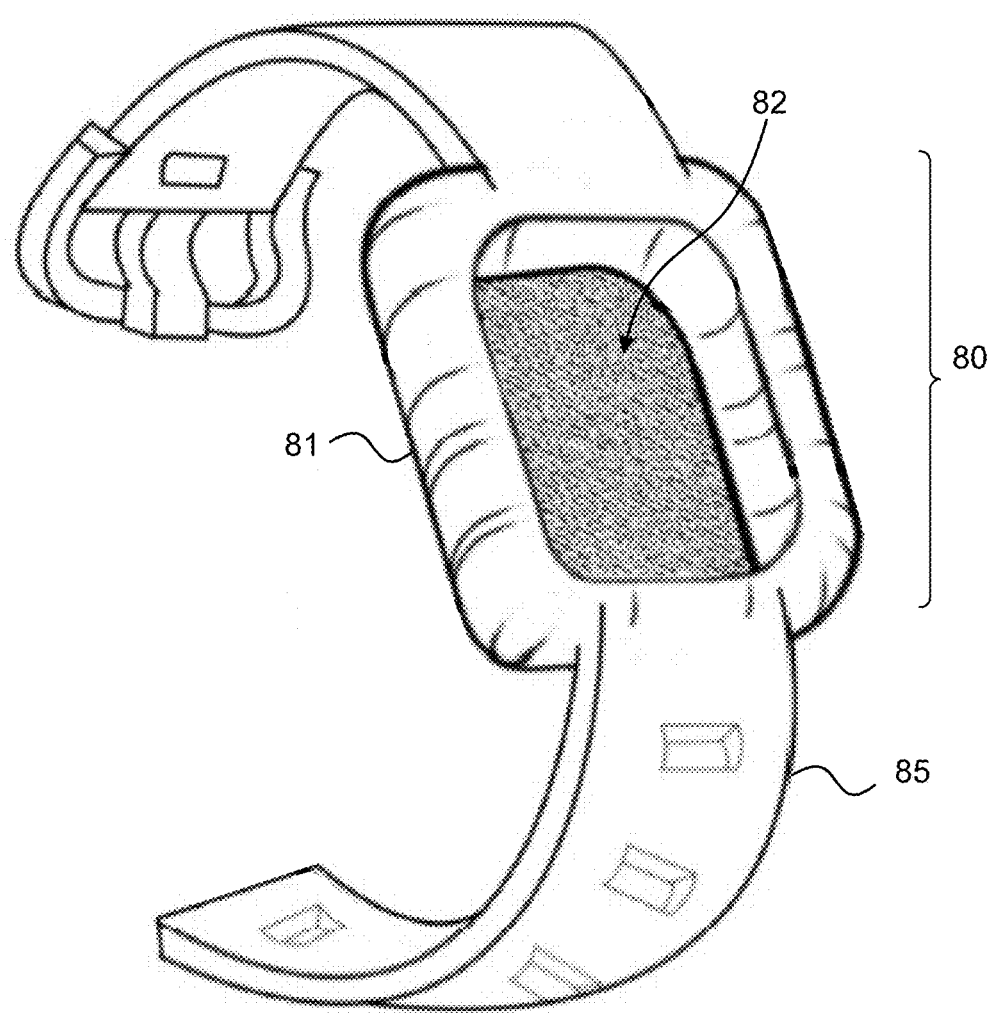
FIG. 17 is a perspective view of the cleaning case of FIG. 15 affixed to a watchband.

A watchband can be fused onto the outer surface of the housing. FIG. 17 is a perspective view of the cleaning case affixed to a watchband. The cleaning case 80 is affixed to a watchband 85 on two opposite sides to fit around a user's wrist with the cleaning component 82 inserted within the housing 81. The watch band 85 can be removably or permanently affixed to the housing 81 of the cleaning case, and can be made from the same or different material than the housing.

Figure 18:
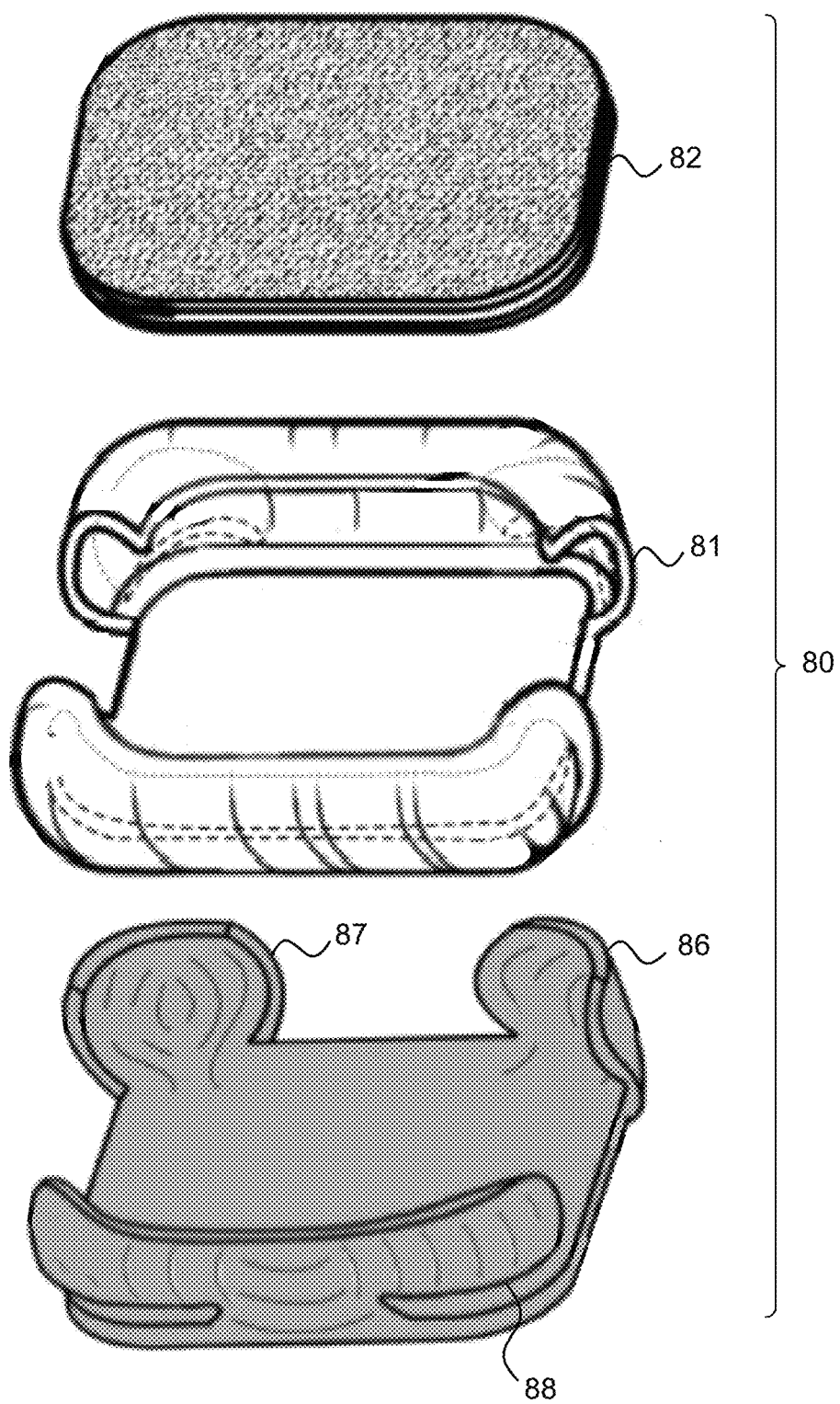
FIG. 18 is an exploded view of one embodiment of a cleaning case for a watch face.

The cleaning case for a watch face can also include a support frame to reinforce the corners of the housing. FIG. 18 is an exploded view of one embodiment of a cleaning case for a watch face. The cleaning case 80 includes a housing 81, a cleaning component 82, and a support frame 86. The housing has a polygonal shape with optional cutouts on one or more sides of the housing. The frame 86 includes a back surface and ends that extend upward away from the back surface. The ends correspond with the corners in the housing. In one embodiment, there are four ends 87 of the frame 86 to correspond with the four corners; however, in a further embodiment two or more of the ends can be fused 88 via a wall to appear as a single end. Other shapes of the support frame are possible.

The support frame is inserted into an interior of the housing and can be made from the same or different material of the housing. However, in one embodiment, the material of the support frame 32 can be harder, thicker, or less flexible than the housing 31. The cleaning component is also inserted into an interior of the housing and affixed on a top surface of the backing of the support frame 86.

A user can insert a watch face into the cleaning case 80 and later remove the watch face for cleaning by pulling down and away from the watch face, a corner of the housing. Once pulled down, the corner allows the flexible walls and other corners to pull away from the watch face and flip over.

The watch face is then removed from the case and turned over for cleaning using the cleaning cloth of the cleaning component.

In a further embodiment, the interior surface of the housing and the exterior of the housing can be different colors to provide a user with different color options for the handheld device case. In such a case, the cleaning component can be optional and if included, can be the same color as the interior of the housing.

While the invention has been particularly shown and described as referenced to the embodiments thereof, those skilled in the art will understand that the foregoing and other changes in form and detail may be made therein without departing from the spirit and scope of the invention.

What is claimed is:

1. An electronic device cleaning case, comprising:
    a cleaning component comprising:
        a backing; and
        a cleaning cloth affixed to a top surface of the backing; and
    a housing formed as a polygon shape and comprising:
        three or more walls, wherein each wall comprises a semi-cylindrical shape;
        four corners each affixed to two of the walls to form the polygon shape of the housing, wherein the cleaning component is affixed to a bottom surface of the housing and the housing is capable of inversion such that the cleaning component is moved from a bottom of the housing to a top of the housing; and
        a support frame to which the corners are affixed.

2. The electronic device case according to claim 1, wherein the frame comprises an X-shape with the corners affixed to each of the ends of the X-shape.

3. The electronic device case according to claim 1, wherein the support frame comprises a stem with two ends extending from each end of the stem at different angles and the corners are each affixed to one of the ends.

4. The electronic device case according to claim 1, wherein a handheld electronic device is placed in the housing.

5. The electronic device case according to claim 4, wherein the housing is inverted by pushing one corner of the housing outward and away from the handheld electronic device.

6. The electronic device case according to claim 1, wherein the walls and the corners are made from the same material.

7. The electronic device case according to claim 1, wherein the corners of the housing are less flexible than the walls of the housing.

8. The electronic device case according to claim 1, further comprising:
    a watchband affixed to two sides of the housing.

9. The electronic device case according to claim 1, further comprising:
    one or more cutouts in the housing.

10. A method for constructing an electronic device cleaning case, comprising:
    constructing a cleaning component by affixing a cleaning cloth to a top surface of a backing;
    forming a housing as a polygonal shape by affixing each of four corners to two or more walls, each wall comprising a semi-cylindrical shape;
    affixing the corners to a support frame; and
    affixing the cleaning component to a bottom surface of the housing,
    wherein the housing is capable of inversion such that the cleaning component is moved from a bottom of the housing to a top of the housing.

11. The method according to claim 10, wherein the frame comprises an X-shape with the corners affixed to each of the ends of the X-shape.

12. The method according to claim 10, wherein the support frame comprises a stem with two ends extending from each end of the stem at different angles and the corners are each affixed to one of the ends.

13. The method according to claim 10, wherein a handheld electronic device is placed in the housing.

14. The method according to claim 13, wherein the housing is inverted by pushing one corner of the housing outward and away from the handheld electronic device.

15. The method according to claim 10, wherein the walls and the corners are made from the same material.

16. The method according to claim 10, wherein the corners of the housing are less flexible than the walls of the housing.

17. The method according to claim 10, further comprising:
    affixing a watchband to two sides of the housing.

18. The method according to claim 10, further comprising:
    forming one or more cutouts in the housing.

* * * * *